United States Patent [19]

Hartog et al.

[11] Patent Number: 4,823,166
[45] Date of Patent: Apr. 18, 1989

[54] OPTICAL TIME-DOMAIN REFLECTOMETRY

[75] Inventors: Arthur H. Hartog, Southampton; Martin P. Gold, Chandler's Ford; Adrian P. Leach, Shirley, all of United Kingdom

[73] Assignee: York Limited, Hampshire, United Kingdom

[21] Appl. No.: 897,943

[22] Filed: Aug. 19, 1986

[30] Foreign Application Priority Data

Aug. 20, 1985 [GB] United Kingdom ............... 8520827

[51] Int. Cl.$^4$ .................. G01J 5/10; G01N 21/65
[52] U.S. Cl. .................... 356/44; 250/227; 356/301; 374/131
[58] Field of Search .................. 356/44, 301; 250/227; 374/131

[56] References Cited

U.S. PATENT DOCUMENTS

| 3,556,659 | 1/1971 | Hawes | 356/301 |
| 3,770,350 | 11/1973 | Stone et al. | 356/301 |
| 4,081,215 | 3/1978 | Penney et al. | 356/301 |
| 4,459,024 | 7/1984 | Gergely | 250/227 X |
| 4,545,253 | 10/1985 | Avicola | 250/227 X |
| 4,545,679 | 10/1985 | Moore et al. | 356/301 |
| 4,555,179 | 11/1985 | Langerhole et al. | 356/342 |
| 4,560,286 | 12/1985 | Wickersheim | 374/131 |

FOREIGN PATENT DOCUMENTS

| 0081702 | 6/1983 | European Pat. Off. |
| 2906985 | 10/1979 | Fed. Rep. of Germany. |
| 2120779 | 12/1983 | United Kingdom. |
| 2140554 | 11/1984 | United Kingdom | 374/131 |

OTHER PUBLICATIONS

Hartog et al., "A Fibre-Optic Temperature Distribution Sensor" Conference: Colloqnium on Optical Fibre Sensors, London, England, May 26, 1982, pp. 2/1&2/2.
Control and Insutrimentation, Sep. 1984, pp. 41–43, John Dakin "Fibre Optic Sensors, Principles & Applications".
J. Phys. E: Sci. Instrum., vol. 18, 1985, pp. 914–919, "Diode Array Spectrometer, an Optimised Design".

Primary Examiner—Vincent P. McGraw
Attorney, Agent, or Firm—Armstrong, Nikaido, Marmelstein & Kubovcik

[57] ABSTRACT

An optical time-domain reflectometry method of sensing respective values of a physical parameter, such as temperature, at different locations along an optical fibre, in which back-scattered optical radiation is used to produce output signals indicative of the values being sensed, is improved by employing optical filtering means to ensure that the back-scattered radiation used is restricted to a preselected single spectral line resulting from inelastic scattering in the fibre, for example one of the Anti-Stokes Raman lines, or to two mutually adjacent such lines.

20 Claims, 6 Drawing Sheets

OPTICAL TIME-DOMAIN REFLECTOMETRY

BACKGROUND OF THE INVENTION

This invention relates to optical time-domain reflectometry (OTDR) and is more particularly concerned with an arrangement in which optical time-domain reflectometry is used to interrogate different portions of an optical fibre extending through a region of interest. The variable to be sensed (the measurand) may be temperature, but other variables could be sensed using similar techniques. Optical fibre sensors can offer the considerable advantages of immunity from electrical interference and the danger of sparks such as might be produced in electrical sensors. Distributed optical fibre sensors are of particular interest since they allow the value of the measurand to be determined at many separate points along the entire length of an optical fibre, thus enabling many independent measurements to be made with a single apparatus.

Distributed sensing in optical fibres is discussed in UK Patent Application No. GB 2 122 337 A and also in other technical literature (e.g. in Proceedings of the 8th European Conference on Optical Communication, Cannes, 1982, A. H. Hartog and D. N. Payne, and in Journal of Lightwave Technology, vol LT-1, pp 498–509, 1983, A. H. Hartog). In these disclosures, the principle of sensing with optical fibres using techniques of optical time-domain reflectometry that had already been established for the detection of faults in optical fibre communications links was demonstrated. Essentially, it was shown that light scattered during the propagation of a pulse of light launched into a fibre at one end, and returned to the launching end by guidance within the fibre, can contain information concerning the distribution along the fibre of a variable of interest (e.g. temperature).

GB 2 122 337 A is concerned mainly with a liquid-filled fibre in which the scattering loss coefficient varies with temperature, thus causing the intensity of the returning scattered radiation to vary in accordance with the local temperature. The time elapsing between the launching of the light pulse and the detection of a sample of the scattered light gives the location of the measurement point. It has been found, however, that similar effects can be observed in solids, and can be obtained not only from modulation of the scattering loss but also, for example, of the numerical aperture of the fibre. Modulation of the total loss is considered in the prior disclosures, but is not of importance to the present application.

Another prior specification (GB 2 140 554 A) dealing with OTDR proposes that the central part of the spectrum of the scattered radiation should be filtered out by means of a so-called optical dichrometer to leave only two spectral regions of interest, namely the regions occupied by the so-called Raman Stokes lines and Raman Anti-Stokes lines. The local temperature is said to be obtainable by comparing the respective optical intensities of back-scattered light in these two spectral regions. However, to obtain best results from this method it would be necessary to correct the measurements for the difference between the fibre attenuations at the various Stokes and Anti-Stokes wavelengths.

BRIEF SUMMARY OF THE INVENTION

According to one aspect of the present invention there is provided an optical time-domain reflectometry method of sensing respective values of a physical parameter at different locations along an optical fibre, characterised in that back-scattered optical radiation used to produce output signals indicative of the values being sensed is restricted to a preselected single spectral line resulting from inelastic scattering in the fibre, or to two mutually adjacent such lines.

According to another aspect of the present invention there is provided distributive sensing apparatus comprising an optical fibre, adapted to be deployed through a region of interest, and remote sensing means arranged for employing optical time-domain reflectometry to sense respective values of a physical parameter at different locations along the fibre, characterised by optical filtering means selected and arranged to ensure that back-scattered optical radiation used to produce output signals indicative of the values being sensed is restricted to a preselected single spectral line resulting from inelastic scattering in the fibre, or to two mutually adjacent such lines.

One embodiment of the present invention provides a fibre optic sensing arrangement, using optical reflectometry, comprising a length of optical fibre (the sensing element); a source of optical pulses operating at a wavelength in the ultra-violet, visible or infra-red regions, and arranged for launching such pulses into at least one end of the optical fibre by way of a directional coupler; detection means for detecting back-scattered radiation directed thereto from the optical fibre by the directional coupler; means for separating individual spectral components of the back-scattered radiation so as to allow just a single such component to reach the detection means; and means for measuring and analysing the signals produced by the detection means so as to yield an output signal related to a variable being sensed.

Commonly, but not necessarily, the variable being sensed will be temperature. Likewise, the spectral component detected will usually be one of the Anti-Stokes Roman lines.

BRIEF DESCRIPTION OF THE DRAWINGS

Reference will now be made, by way of example, to the accompanying drawings, in which.

DETAILED DESCRIPTION

Figure 1:
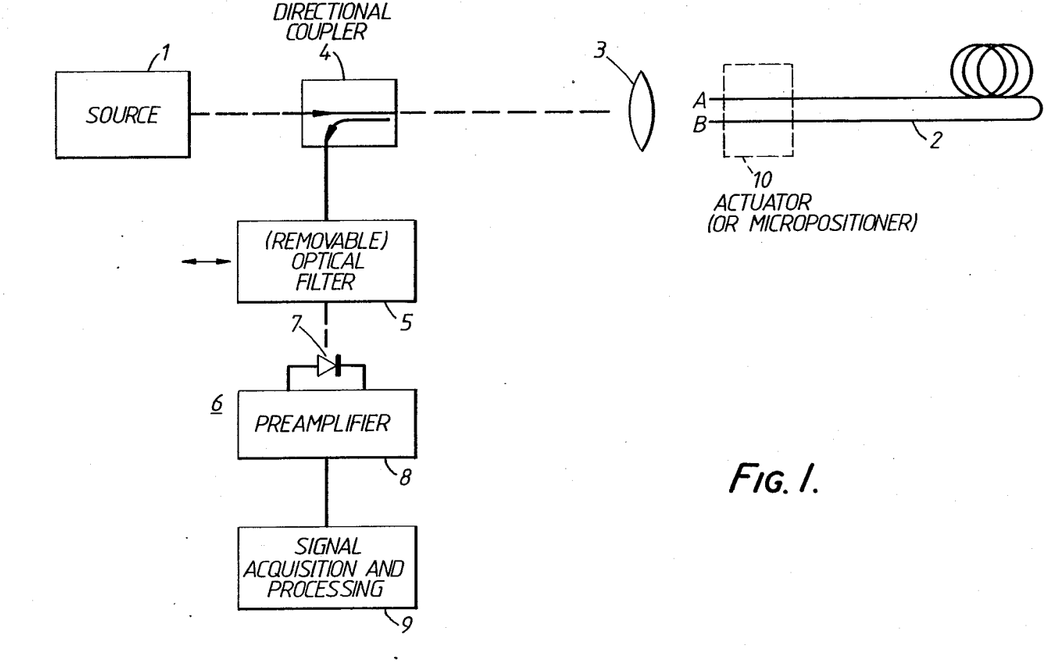
FIG. 1 is a schematic diagram illustrating the layout of a distributed temperature-sensing apparatus embodying the present invention.

As illustrated in FIG. 1, a probe pulse of optical radiation (ultra-violet, visible or infra-red) is generated by an optical source 1 and launched by means of appropriate launching optics 3, via a directional coupler 4, initially into one end A of a sensing fibre 2. The optical source 1 is conveniently but not necessarily a semiconductor injection laser. The directional coupler 4 could be a device fabricated from optical fibres, or a beam-splitter or any other suitable means of performing the function of separating forward and backward-propagating light.

The type of fibre 2 used as the sensing medium can be any one of the multimode, single-mode or single-polarisation types, depending upon the particular application concerned.

Some of the probe pulse light in the fibre 2 is scattered in the backward direction at angles from the fibre axis such as to be recaptured by the waveguide structure of the fibre and guided back towards the launching end A. On reaching the directional coupler 4, this returned scattered light is directed to optical filtering means 5 which pass a selected Anti-Stokes Raman line but block off the remainder of the spectrum. The filtering means may take the form of any device which selectively reflects, absorbs, scatters, deflects, polarises or otherwise separates the different spectral components of the incident radiation.

The portion of the returned scattered light that is passed by the filter 5 reaches an optical receiver 6 which could conveniently comprise a detector 7 followed by a low-noise preamplifier 8 and possibly further stages of amplification and electrical filtering. The electrical signal is then sent to electronic processing circuitry 9 which produces therefrom a set of readings representative of a waveform showing the temperature distribution along the fibre 2 from end A to its other end B. This process is preferably repeated and the backscatter waveforms from each set of readings are averaged, the average values being used to calculate the temperature distribution, until the processor 9 has measured to sufficient accuracy the time dependence of the intensity of the Anti-Stokes Raman line concerned. The processor 9 may also control other elements of the apparatus, for example the source 1 or the optical filter 5.

Thus, for each single pulse of light generated by the source 1, the processor 9 would cause a series of measurements of the back-scattered ight intensity to be made at very short time intervals. Ideally, all time samples needed should be acquired following each laser pulse, in order to enhance the speed of the sensing operation and to avoid the introduction of noise due to short-term fluctuations in the energy launched by the source. Nevertheless any other convenient method for acquiring the time-dependence of the backscattered signal may be employed.

Figure 3:
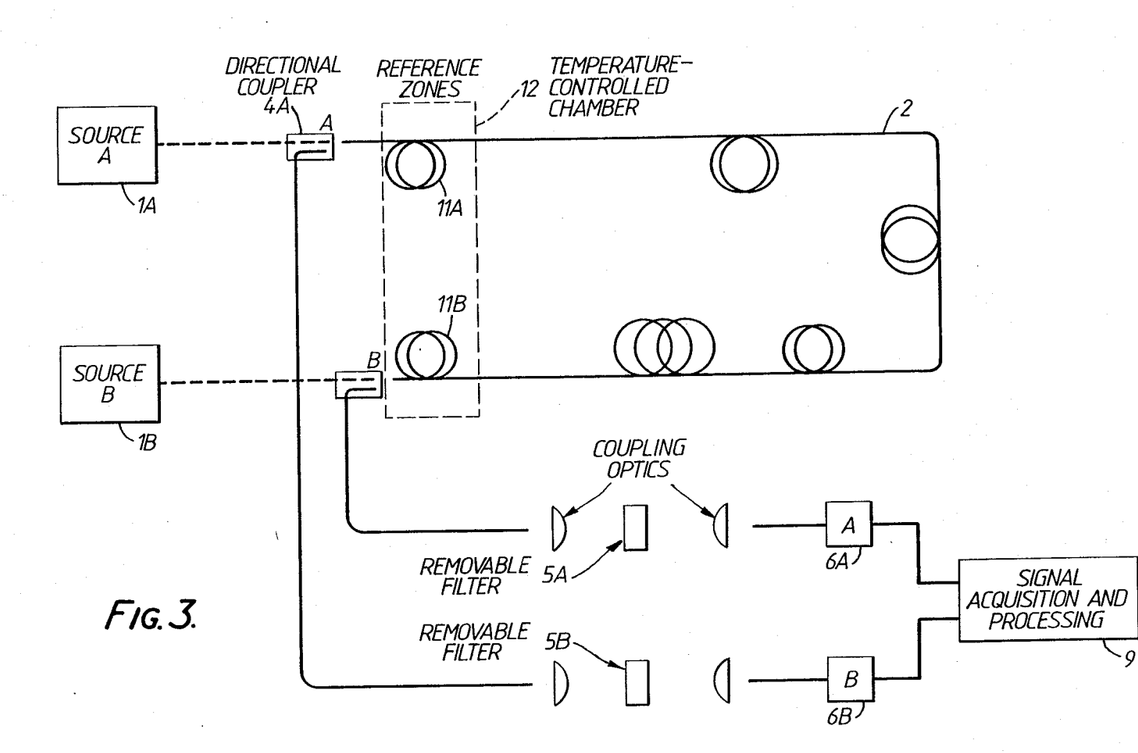
FIG. 3 illustrates schematically a second temperature-sensing apparatus embodying the present invention.

After averaging the results obtained by launching pulses into end A of the fibre 2, the process is preferably then repeated, but launching the probe pulses into, and detecting the scattered light returned from, the other end B of the fibre. The changing of the launching ends may be accomplished as illustrated in FIG. 1 by means of a mechanical actuator 10 under the control of the processor 9 or, as illustrated in FIG. 3, by duplicating the measurement arrangement at each fibre end. Alternatively, for example, this function may be implemented using a mechanical fibre switch, or using an electro-optic or acousto-optic deflector.

The ratio of the scattered power returning from a given section of fibre to the energy of the probe pulse entering that section is referred to as the backscatter factor. It will be appreciated that, for the selected portion of the spectrum returned, the described sensing arrangement operates in dependence upon the backscatter factor to deduce the spatial distribution of the measurand.

A major advantage of performing the measurement from each end of the fibre is that it then becomes possible to separate variations in the signal caused by temperature fluctuations along the fibre from those occasioned by axial changes of the fibre loss. By calculating the geometric mean of the backscatter signals measured from both ends of a fibre and returning from a particular location, the effect of any propagation losses can be eliminated, leaving, in the length-dependence of the processed signal, only the effect of changes in the backscatter factor, i.e. changes of numerical aperture or of the scattering coefficient for the spectral line of interest. Changes in numerical apertures are not normally significant, unless a fibre of special design is used, and their effects can in any case be eliminated as described in the prior specification GB 2 122 337 A.

Figure 5A:
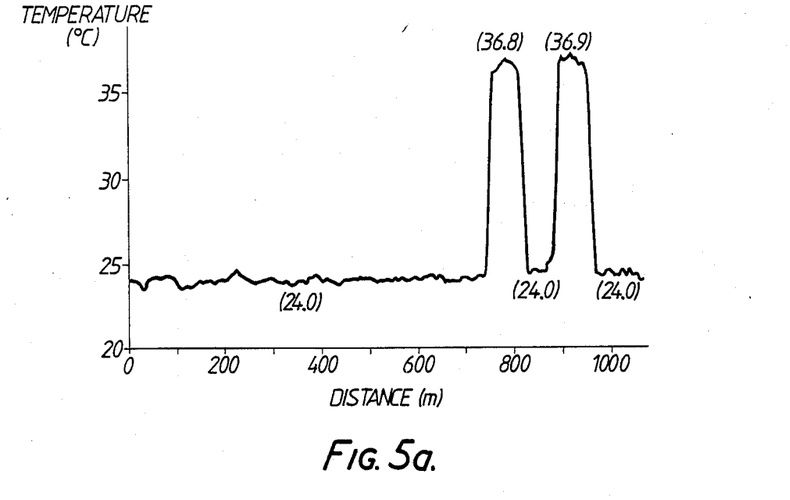
Figure 5B:
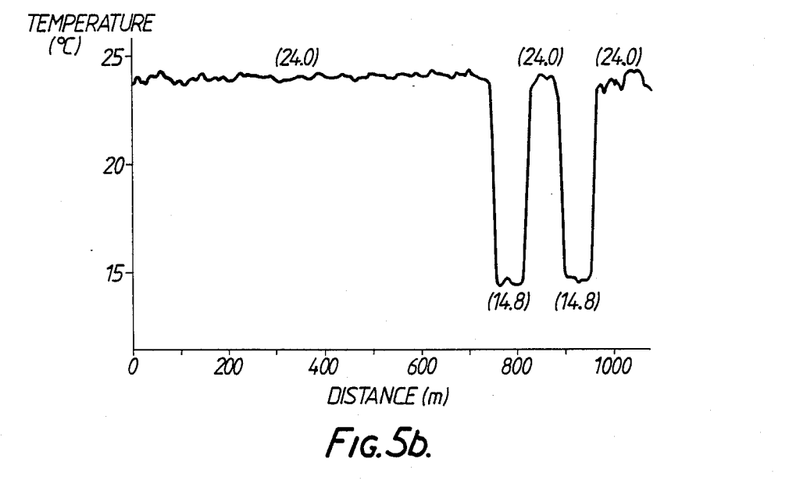

FIGS. 5($a$) and ($b$) show respective temperature distributions obtained by an embodiment of the invention, substantially as described above, along a fibre longer than 1 km. In this practical example the source 1 was a wide contact GaAlAs semiconductor laser operating at about 1.5 W. The probe pulses had a bandwidth of a few nm, centered on a wavelength of 854 nm, the pulse width being 40 ns and the pulse repetition rate 4 kHz. The overall spatial resolution of the sensing apparatus was about 7.5 m, and the illustrated results were achieved by averaging over $10^5$ pulses in each direction. In this case the Anti-Stokes Raman line used was displaced from the incident wavelength of 854 nm by about 31 nm (440 cm$^{-1}$). The optical filter 5 used was an interference filter having a pass bandwidth of about 10 nm at half peak values and giving good rejection of the probe pulse wavelength (typically a maximum transmission at the probe pulse wavelength, 854 nm, of 0.01% or less).

Figure 7:
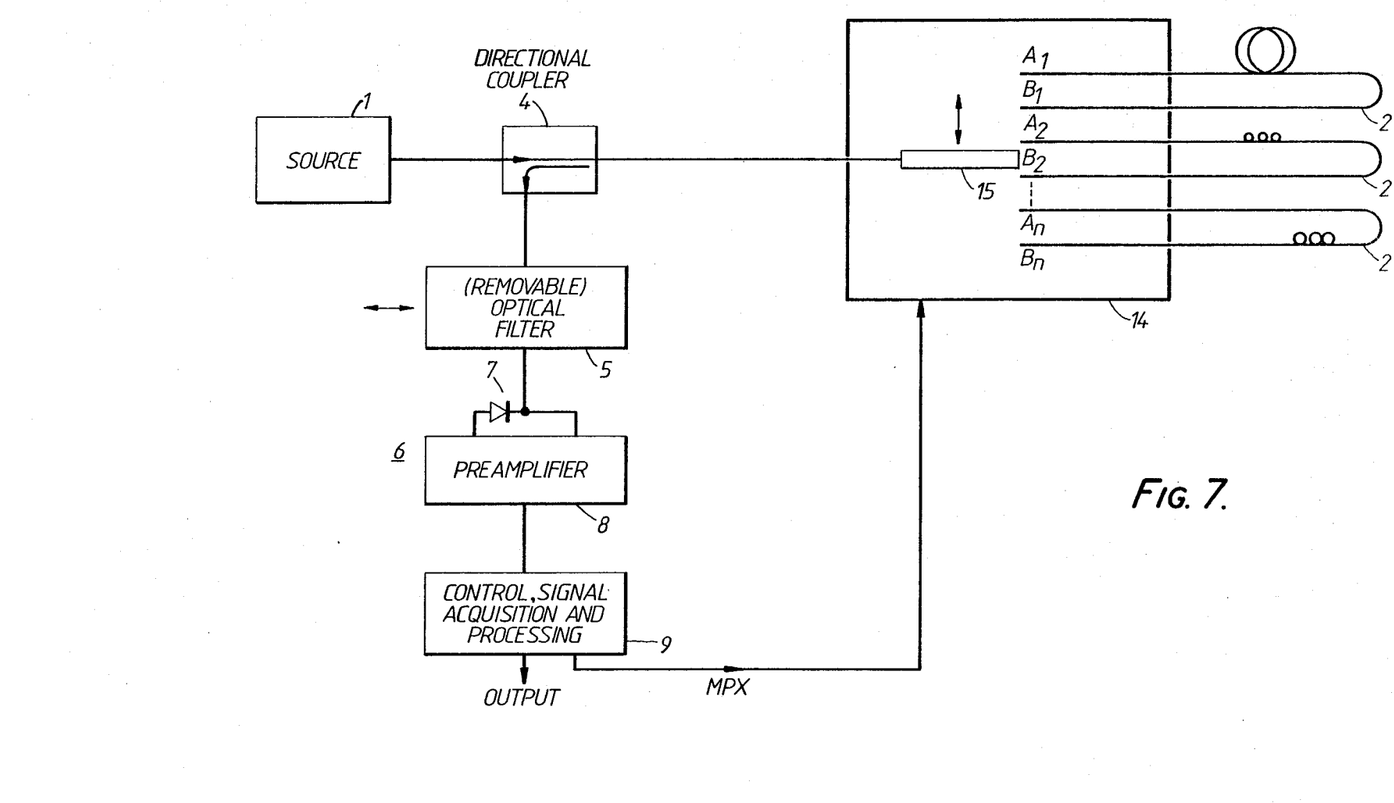
FIG. 7 shows schematically a fourth apparatus embodying the present invention.

FIG. 7 illustrates an embodiment of the invention in which a plurality of optical fibre ends $A_1$, $B_1$, $A_2$, $B_2$, . . . $A_n$, $B_n$ can be addressed using just one set of terminal equipment (processor, source, receiver, etc). To achieve this, mechanical or optical selection means 14 for switching from one fibre end to another are provided between the incoming radiation and the plurality of fibre ends $A_1$, $B_1$, . . . $A_n$, $B_n$. The selection means 14 can take the form of a fibre switch, which may comprise a section 15 of fibre movable, under the control of the processor 9, in two transverse directions by means of linear motors. Such a fibre switch is available from York Harburg Sensor GmbH of Hamburg, West Germany under the name "MS-1 Multiposition Optical Fibre Switch". In accordance with a control signal MPX sent to the fibre switch, the fibre section 15 may be moved into abutting alignment with a selected fibre end. The fibre ends may be anti-reflection coated, or immersed in index-matching liquid, to reduce reflection. It is thus possible to share the terminal equipment, which is expected to represent a large proportion of the total cost of such a sensing system, between many separate sensing fibres. For example, it then becomes conceivable for the sensing fibres to be duplicated, which gives additional reliability owing to the redundancy of the sensing elements. If the processor is able to detect failure of a fibre, such an arrangement can afford a fail-safe method of operation.

Figure 4:
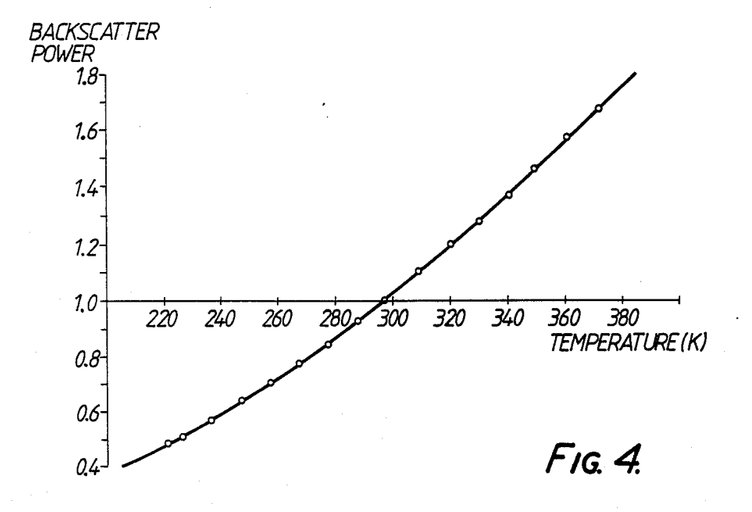
FIG. 4 is a graph showing variation of measured power as a function of temperature, FIGS. 5(a) and (b) are graphs illustrating respective temperature distributions.

Effects of built-in defects in the fibre such as longitudinal temperature-independent variations either of the scattering coefficient or of the capture fraction may also be eliminated by calibrating the fibre prior to installation with a known temperature distribution. The sensor then measures departures of the backscatter factor from those determined at the time of calibration. These departures may then be interpreted by the processor in terms of either a tabulated variation of the backscatter factor with temperature (for the spectral line of interest) or in terms of a theoretical model relating absolute temperature to intensity via the frequency shift between the source and the selected spectral line. Such a calibration function for a given point along the fibre is shown in FIG. 4, in which measured back-scatter power for an Anti-Stokes line is normalised to 1 at room temperature (297K), when, for the conditions used in the practical example outlined above, it is typically 100 pW.

The spatial resolution, i.e. that length of fibre over which an abrupt (step-like) temperature change appears to be spread, as measured between points corresponding to 10% and 90% of the maximum amplitude of the temperature change, is limited both by the width of the pulse launched and by the bandwidth of the processing circuitry employed. Additionally, the processing circuitry must be able to sample the electrical signal generated by the receiver at sufficiently close time intervals, corresponding to adjacent points of interest in the fibre. In order to obtain independent readings from the fibre, distances corresponding to at least two spatial resolutions must be allowed between adjacent points of interest. The effective spatial resolution of a sstem can be improved by winding coils of the fibre to monitor many individual points of interest. That is, if a section of the fibre is wound to form a coil having a length of roughly twice the spatial resolution, or more, that section will provide an unambiguous measurement of the measurand at that location which is independent of the value of the measurand at adjacent sections of fibre.

The scattering process encompasses a variety of phenomena, all of which are related to localised fluctuations of the refractive index, the nomenclature of which has changed over the years. For clarity, Rayleigh scattering will be referred to in this application as that spectral line of the scattered spectrum which is at the same wavelength as the probe pulse and is caused by fluctuations of the refractive index on a length scale small compared with the wavelength of the incident light. In contrast, Brillouin and Raman spectral lines of the scattered light are displaced with respect to the probe wavelength; these lines result from inelastic scattering processes. The Brillouin lines originate in the collision of the light wave with a sound wave whose acoustic wavelength is similar to that of the optical wavelength of the probe pulse. Two back-scattered Brillouin lines are normally observed in optical fibres and these are typically shifted by approximately 27 GHz (in silica for a probe pulse at a wavelength of 633 nm) with respect to the probe wavelength. One of the lines (the anti-Stokes Brillouin line) contains scattered light which has gained energy in the collision process and is consequently at a shorter wavelength. The second Brillouin line (the Stokes line) is displaced to a longer wavelength by an equal frequency shift.

In contrast, the Raman scattered lines are displaced with respect to the probe wavelength by much larger frequency shifts which are characteristic of various molecular vibrations existing in the fibre material. These lines may be separated from the remainder of the spectrum using relatively simple optical arrangements. In practice, the Raman scattered lines are generally broad. For example, an Anti-Stokes Raman line in $SiO_2$, whose peak is displaced by approximately 440 $cm^{-1}$ with respect to the incident radiation, is part of a broad band extending from approximately 200 $cm^{-1}$ to 520 $cm^{-1}$ a case the effective position and width of the Raman line used is determined more by the characteristics of the filter employed in the sensing arrangement than those of the Raman spectrum itself.

Figure 2:
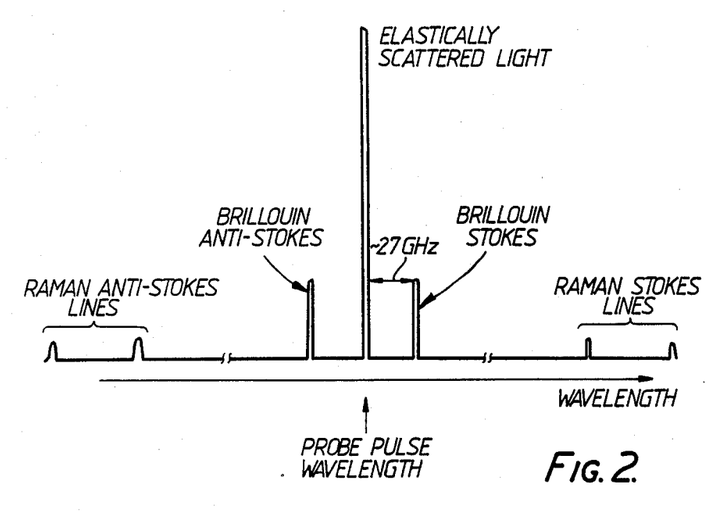
FIG. 2 is a graph showing a typical spectral distribution of back-scattered radiation.

FIG. 2 shows an illustration of the various spectral lines present in the backscattered light. It has been found that the intensity of the inelastically scattered light in solids is usually more sensitive to temperature than the elastically scattered light; indeed it now seems possible that a substantial contribution to the sensitivity in the prior art arrangement of GB 2 122 337 A may have been due to inelastically scattered components.

The selected use of just one inelastically scattered line, such as the Anti-Stokes line, has the advantage over a prior arrangement (in which a comparison between the intensities of Anti-Stokes and Stokes lines is used) that the measurement is no longer sensitive to any differential attenuation between different wavelengths being sensed. There is also a useful gain in the sensitivity of the device to temperature as compared with a system based on measuring the ratio of the Anti-Stokes and Stokes intensities, since the respective intensities of such lines have been found to vary, as a function of temperature, in the same sense. In addition, the parasitic sensitivity of the device, to drifts in the emission wavelength of the source (which can provide a serious cause of measurement error), can be reduced in this way as compared with the case of both Stokes and Anti-Stokes lines. Moreover, since only one filtered wavelength is required, the filtering may take the form of a simple optical bandpass filter, which provides a simpler and more robust arrangement than the grating dichrometer previously employed.

In order to detect and correct for possible long-term changes in the energy and wavelength of the source or sources, it is desirable to monitor both of these either directly or indirectly. As illustrated in FIG. 3, one possibilitY is to incorporate one or more short reference sections of fibre (11A, 11B) which are held at a constant and known temperature in a temperature-controlled chamber 12.

Monitoring of this reference section, using filters 5A and 5B, will allow the processor 9 of the sensing device to check the calibration in a quasi-continuous manner thus ensuring, for example, that changes in the wavelength of the source (which would alter the calibration of the sensing system) can be detected and corrected. The reference fibre need not be placed in series with the sensing fibre; a parallel configuration, in which the reference fibre is, for example, switched into the measurement position is also conceivable.

The source wavelength can also be monitored directly, for example by means of a scanning spectrometer arrangement.

It will be seen from FIG. 3 that provision has been made in this arrangement for removal of the filters 5A and 5B (or replacement by an optical attenuator) so as to permit measurement of the total backscatter signal in all wavelengths to which the detecting device is sensitive. Measurement of the total backscatter signal (i.e. without filtering) in the reference section gives a signal proportional to the energy launched by the laser, which allows subsequent normalisation. Indeed, the total backscatter signal measured over the entire fibre can be used in a normalisation procedure to correct for such effects as diameter changes or variations in the material composition along the fibre. Monitoring of the total back-scattered signal could alternatively be effected by means of an additional detecting arrangement into which a sample of the scattered signal is directed without filtering, such a sample being derived, for example, from a beam-splitting arrangement or reflection from the filter.

The arrangement described so far has provided only for a single pulse to be launched for each set of readings made by the processor. In certain circumstances (particularly if an extremely high spatial resolution is required) it may be advantageous to launch a series of pulses whose width or spacing or amplitude is varied, or coded in some way. After detection, knowledge of the pulse coding or modulation is used to retrieve the details of the time variation of the scatter return. In the limit, instead of using a pulsed source, it is possible to modulate the intensity of the source with a continuous wave signal whose frequency is varied in a known manner. For example, where the source is a semiconductor laser diode, the intensity may be modulated by varying driving current through the source. These approaches may be regarded as analogous to techniques (known variously as pseudo-random coding, pulse-compression coding, optical frequency-domain reflectometry or FMCW) which are used in the field of radar and/or in the field of fault-location in optical fibre links. They are equivalent to the single-pulse time-domain method, but can in some cases lead to an improvement in the signal-to-noise ratio at receiver output and hence to improvements in measurement accuracy or measurement time.

With regard to the desirability of measuring with pulses launched respectively into both ends of the fibre, under certain circumstances it will be inconvenient for the two fibre ends to be positioned at the same location. This problem can be resolved by duplicating a portion of the equipment sufficient to perform the measurement from each end and to cause each part of the equipment to be linked by some form of communication channel so that information obtained from each end may be combined.

Figure 6:
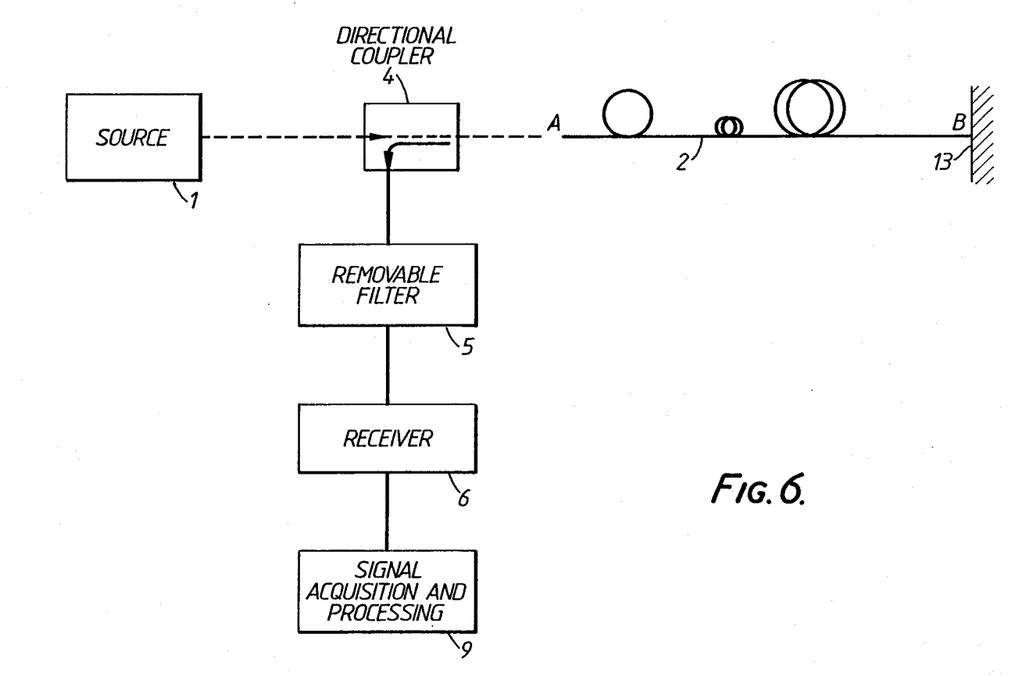
FIG. 6 shows schematically a third apparatus embodying the present invention.

Alternatively, just a single fibre end A may be employed, the other end B being made to be highly reflective as illustrated diagrammatically at 13 in FIG. 6. In this arrangement, the signal received initially is identical to that which would have been measured without the reflector in position. After a time equal to a round trip in the fibre, however, a second backscatter waveform will be observed, whose time dependence is substantially the same as if it had been measured directly from the reflective end B of the fibre.

As a result of such reflection at the end B, the optical signals travel additional distances in the fibre and are thus more heavily attenuated. The equipment is thus required to have a better dynamic range than if the measurement were made on both fibre ends directly. Assuming that the power launched into the fibre and the receiver sensitivity cannot be improved, additional signal-averaging will be required which would reduce the rate at which the sensor output can be updated. However, the waveforms measured from each end may be combined in such a way that the contribution of the remote-end signal is only to make small, slowly-varying corrections to the value of the local attenuation which is used in the derivation of the backscatter factor from the return signal. It should then be possible to average more measurements from the remote end than from the launch end measurement and thus not degrade substantially the update-rate. In other words it may be possible to process the information from the two ends in such a way that the accuracy required of the remote end measurement is less than that of the (now primary) near-end measurement. Similar processing could also be used to advantage in non-reflective arrangements such as those of FIGS. 1 and 3.

A further possibility is for two fibres to be cabled alongside one another, in the same jacket and in close thermal contact, and spliced together (i.e. fused end to end) at the remote end. Such methods of achieving measurement effectively from opposite ends of a fibre serve to overcome restrictions that would otherwise exist as regards the deployment of such sensing fibres in practice.

The intensity in a given Anti-Stokes Raman line will decrease with increasing frequency shift, while the sensitivity to temperature (i.e. the derivative of intensity with respect to temperature, normalised to the absolute temperature) will increase. It may therefore be possible and advantageous, to select for operation of the sensing device an Anti-Stokes Raman line that is particularly appropriate to the temperature range of interest. For example, in fibres made from high-silica glasses, one of the Anti-Stokes lines is displaced by approximately 440 cm$^{-1}$ with respect to the incident radiation; this line is particularly useful at temperatures in a broad range around 300 K. At very high temperatures, it may be better to select an Anti-Stokes line having a larger shift, in order to enhance the sensitivity. If such lines are not naturally present in the fibre Raman spectrum, special additives may be incorporated. For example it is known that the addition of $P_2O_5$ or $B_2O_3$ to silica gives rise to spectral lines having an increased Raman shift. In contrast, at extremely low temperatures, the intensity in each Raman Anti-Stokes line falls rapidly, and the selection of lines having smaller frequency shifts will be advantageous for operation at cryogenic temperaures.

It is also possible to alter the fibre composition so as to enhance the strength of a chosen Raman line. For example, $GeO_2$, which has a large Raman cross-section and an Anti-Stokes Raman line at a wavelength very close to that for silica, may be incorporated in the composition of the fibre. However, the addition of too much $GeO_2$ may result in losses which are unacceptable.

As regards the basic structure of the fibre, in particular of a type known as a multimode fibre, increasing the core diameter can enable higher input power to be used. Also, so as to increase the proportion of scattered light recaptured by the fibre, the fibre may be designed so as to have a large numerical aperture, but this must be balanced against the fact that an increase in the numerical aperture tends to be associated with a decrease in the effective optical bandwidth of the fibre.

The Brillouin scattered signal is also temperature sensitive. In this case, both the frequency and the intensity are found to vary with temperature and either or both can thus be used to form the basis of a distributed sensor embodying the present invention. At room temperature, the Anti-Stokes and Stokes Brillouin lines are almost equal in intensity and contain almost the same information. Thus, the two lines could be added together to provide information concerning the temperature, thereby improving slightly the signal-to-noise ratio.

The Brillouin scattered light is particularly useful at cryogenic temperatures since the Brillouin intensity varies more consistently with temperature in this region, and the signal available is higher in this region, than the Raman signal and thus can provide the processor with a better signal-to-noise ratio.

A suitable optical filter for such purpose could be a Fabry-Perot etalon or a fibre-ring interferometer. In order to gain useful information from the Brillouin scattered light it is necessary to use a source with a particularly narrow linewidth (preferably less than 5 GHz FWHM) and stable operating frequency. For example, a Helium-Neon laser with suitable external modulation could be used, or a narrow line-width semiconductor laser.

Although an embodiment of the invention will most usually operate on the basis of light comprising just a single Raman or Brillouin line (either Stokes or Anti-Stokes) of the back-scattered light spectrum, in some cases it may be possible and advantageous to base the measurements, in embodiments of the invention, upon two such spectral lines that are closely adjacent to one another. In general, however, best results should be obtainable with the Anti-Stokes Raman line. The temperature sensitivity obtained with this line is found to be typically about 650 times greater than that for the Stokes Raman line at 100° K, 10 times greater at room temperature, and still about 3 times greater at 600° K.

Although potentially the use of the Brillouin lines offers a far better signal-to-noise ratio, and a wider temperature range, than the Raman lines, the technology of narrow line-width lasers presently available limits the use of the Brillouin lines since these lines are generally inconveniently close in wavelength to the probe pulse.

Embodiments of the invention can be used to considerable advantage for monitoring temperature distributions in electrical power transformers and cables, in liquid nitrogen, along oil pipelines, and throughout buildings (for example in fire-alarm or air-conditioning systems).

We claim:

1. An optical time-domain reflectometry method of sensing respective values of a physical parameter at different locations along an optical fibre, in which method radiation is launched into the fibre at one end thereof and resulting back-scattered optical radiation is used to produce electrical output signals indicative of the values being sensed, wherein optical filtering means are employed to ensure that said back-scattered radiation used to produce the electrical output signals is restricted to a preselected single spectral line resulting from inelastic scattering in the fibre.

2. An optical time-domain reflectometry method of sensing respective values of a physical parameter at different locations along an optical fibre, in which method radiation is launched into the fibre at one end thereof and resulting back-scattered optical radiation is used to produce electrical output signals indicative of the values being sensed, wherein optical filtering means are employed to ensure that said back-scattered radiation used to produce the electrical output signals is restricted to two preselected spectral lines that are closely adjacent to one another and result from inelastic scattering in the fibre, the back-scattered radiation of these lines being directed from the filtering means onto a common optical detector, so as to be additive in effect thereon.

3. A method as claimed in claim 1, wherein a reference section of optical fibre, arranged in operative combination with the fibre of claim 1, is subjected to a known constant value of the said parameter so as to enable changes in the output of a source of radiation launched into the fibres to be monitored.

4. A method as claimed in claim 2, wherein a reference section of optical fibre, arranged in operative combination with the fibre of claim 2, is subjected to a known constant value of the said parameter so as to enable changes in the output of a source of radiation launched into the fibres to be monitored.

5. A method as claimed in claim 1, wherein, after first output signals have been obtained using back-scattered radiation restricted to a preselected single spectral line, second output signals are obtained using unrestricted back-scattered radiation and the said first and second output signals are then used to produce a final set of normalised output signals.

6. A method as claimed in claim 2, wherein, after first output signals have been obtained using back-scattered radiation restricted to two preselected mutually adjacent spectral lines, second output signals are obtained using unrestricted back-scattered radiation, and the said first and second output signals are then used to produce a final set of normalised output signals.

7. Optical time-domain reflectometry apparatus, for sensing respective values of a physical parameter at different locations throughout a region of interest, said apparatus comprising:
   an optical fibre, for deployment through said region of interest;
   source means for launching radiation into said optical fibre at one end thereof, to be back-scattered therein at different locations therealong;
   sensor means for receiving, from said one end of the optical fibre, such back-scattered radiation and producing electrical signals in response thereto;
   electronic processing circuitry, having an input connected to said sensor means, for employing said electrical signals to produce electrical output signals indicative of said respective values; and
   optical filtering means, arranged between said sensor means and said one end of the optical fibre, for ensuring that said back-scattered radiation received by said sensor means is restricted to a preselected single spectral line resulting from inelastic scattering in the fibre.

8. Optical time-domain reflectometry apparatus, for sensing respective values of a physical parameter at different locations throughout a region of interest, said apparatus comprising:
   an optical fibre, for deployment through said region of interest;
   source means for launching radiation into said optical fibre at one end thereof, to be back-scattered therein at different locations therealong;
   a sensor for receiving, from said one end of the optical fibre, such back-scattered radiation and producing electrical signals in response thereto;
   electronic processing circuitry, having an input connected to said sensor, for employing said electrical signals to produce electrical output signals indicative of said respective values; and
   optical filtering and directing means, arranged between said sensor and said one end of the optical fibre, for ensuring that said back-scattered radiation received by said sensor is restricted to two preselected spectral lines that are closely adjacent to one another and result from inelastic scattering in the fibre, and for directing the radiation of those lines onto said sensor so as to be additive in effect thereon.

9. Apparatus as claimed in claim 7, wherein said preselected spectral line results from Anti-Stokes Raman scattering in said fibre.

10. Apparatus as claimed in claim 8, wherein said two preselected mutually adjacent spectral lines result from Anti-Stokes Raman scattering in said fibre.

11. Apparatus as claimed in claim 7, wherein said preselected spectral line results from Brillouin scattering in said fibre.

12. Apparatus as claimed in claim 8, wherein said two preselected mutually adjacent spectral lines result from Brillouin scattering in said fibre.

13. Apparatus as claimed in claim 7, wherein said fibre is doubled back on itself so that said one end thereof is arranged adjacent to the other end of the fibre, said two ends of the fibre facing said source means which are operative so as to launch radiation into said fibre at its said two ends alternately, and wherein said electronic processing circuitry is operative so as to combine electrical signals produced in response to back-scattering of radiation launched into said fibre at said one end thereof with electrical signals produced in response to back-scattering of radiation launched into said fibre at its said other end so as to produce a final set of adjusted electrical output signals.

14. Apparatus as claimed in claim 8, wherein said fibre is doubled back on itself so that said one end thereof is arranged adjacent to the other end of the fibre, said two ends of the fibre facing said source means which are operative so as to launch radiation into said fibre at its said two ends alternately, and wherein said electronic processing circuitry is operative so as to combine electrical signals produced in response to back-scattering of radiation launched into said fibre at said one end thereof with electrical signals produced in response to back-scattering of radiation launched into said fibre at its said other end so as to produce a final set of adjusted electrical output signals.

15. Apparatus as claimed in claim 7, wherein the other end of said fibre is reflective, and said electronic processing circuitry is operative so as to combine primary electrical signals, produced in response to back scattering of radiation propagating towards said reflective end of the fibre, with secondary electrical signals, produced in response to scattering of radiation after reflection at said reflective end, so as to produce a final set of adjusted electrical output signals.

16. Apparatus as claimed in claim 8, wherein the other end of said fibre is reflective, and said electronic processing circuitry is operative so as to combine primary electrical signals, produced in response to back-scattering of radiation propagating towards said reflective end of the fibre, with secondary electrical signals, produced in response to scattering of radiation after reflection at said reflective end, so as to produce a final set of adjusted electrical output signals.

17. Apparatus as claimed in claim 7, wherein respective sources of optical radiation are provided at the two opposite ends of the fibre, the said sources being controlled so as to launch radiation into the fibre at its two opposite ends alternately, and processing means of the apparatus are such as to combine output signals resulting from back-scattering of radiation launched into the fibre at one end thereof with output signals resulting from back-scattering of radiation launched into the fibre at its other end so as to produce a final set of adjusted output signals.

18. Apparatus as claimed in claim 8, wherein respective sources of optical radiation are provided at the two opposite ends of the fibre, the said sources being controlled so as to launch radiation into the fibre at its two opposite ends alternately, and processing means of the apparatus are such as to combine output signals resulting from back-scattering of radiation launched into the fibre at one end thereof with output signals resulting from back-scattering of radiation launched into the fibre at its other end so as to produce a final set of adjusted output signals.

19. Apparatus as claimed in claim 7, further comprising a set of optical fibres having respective one ends arranged adjacent to said one end of the optical fibre of claim 7, and selection means operatively associated with said sensor means and operable to select different fibres for use at different times.

20. Apparatus as claimed in claim 8, further comprising a set of optical fibres having respective one ends arranged adjacent to said one end of the optical fibre of claim 8, and selection means operatively associated with said sensor and operable to select different fibres for use at different times.

* * * * *